July 16, 1957    L. J. GARLONI    2,799,074
METHOD OF MAKING LIGHTWEIGHT AGGREGATES
Filed Jan. 24, 1952
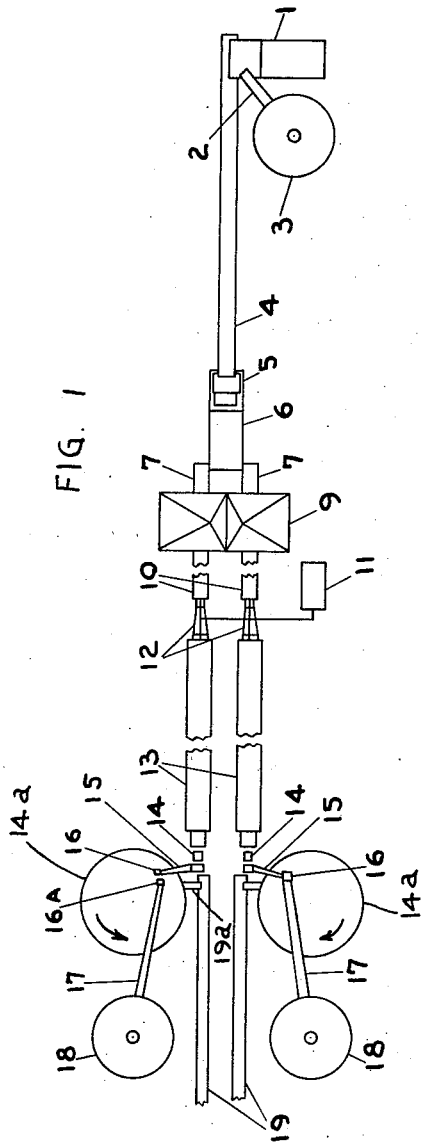
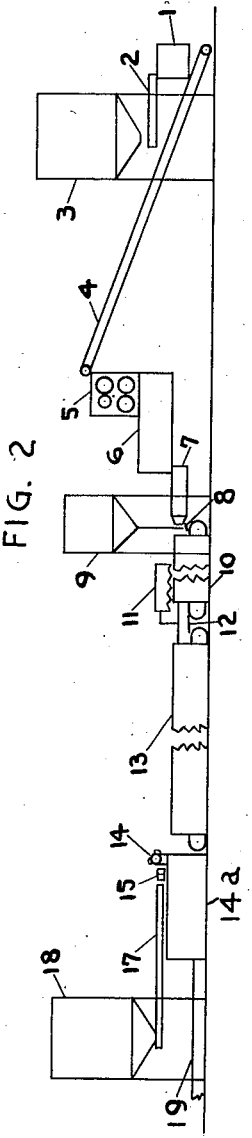
INVENTOR.
LOUIS J. GARLONI
BY

United States Patent Office 2,799,074
Patented July 16, 1957

2,799,074
METHOD OF MAKING LIGHTWEIGHT AGGREGATES

Louis J. Garloni, Kensington, Conn.

Application January 24, 1952, Serial No. 268,060

3 Claims. (Cl. 25—156)

This application is a continuation-in-part of my copending application, Serial No. 112,286, filed August 25, 1949, and now abandoned.

This invention relates to lightweight aggregate to be used in concrete or other building material and to methods of producing such an aggregate.

Lightweight aggregates for use in concrete and similar building material have heretofore been made from pelletized clay, shale and slate containing sufficient quantities of carbonaceous matter to cause vesiculation upon heating. The particles or pellets are heated in a rotary kiln in order to cause the requisite expansion and vesiculation. Difficulty has been encountered from the tendency of the pellets to agglomerate.

When agglomeration or bunching of the pellets occurs, heat is prevented from penetrating the mass to cause the proper bloating and, therefore, the end product is not fully expanded and is unsuitable for use as a lightweight aggregate.

It is an object of this invention to produce a lightweight aggregate by a novel method that substantially eliminates agglomeration between particles during heating.

It is a further object of the invention to provide a method of ensuring that all of the particles of aggregate are completely expanded throughout their mass.

Another object of the invention is to produce a lightweight aggregate which involves adding carbonaceous admixtures to clay, pugging the mixture, extruding it through dies to form pellets, drying the pellets and rapidly firing the pellets.

A further object of the invention is to provide a method of simultaneously producing fines and lightweight aggregate.

In handling a large volume of material for mass production, the process of the present invention may be speeded up by dropping a continuous stream of pellets upon the hearth of the kiln. To prevent the possibility of the pellets agglomerating, I introduce and spread upon the hearth a layer of dust either in advance of or simultaneously with the dropping of the pellets. The dust or cushioning material used is fly ash. Tht additional advantage provided by this method is that when this pulverized material is burned it may be utilized as fines in the making of concrete block or the like, together with the bloated pellets. Since fly ash is available in large quantities, and is at present a waste product that is not otherwise easily disposed of, this material is preferred in my process as a cushioning dust since its carbon content contributes heat to the kiln, while the completely burned fly ash residue makes excellent fines for use in concrete block. If a large amount of fines are required for use in making concrete block or the like, an excess of fly ash may be placed upon the hearth as a cushioning dust which will not interfere with the bloating of the clay pellets. The carbonaceous material within the fly ash is burned off and provides the desired type of ash which is very suitable for use as fines and obviates the necessity of crushing bloated clay pellets to make fines.

Although the novel features which are believed to be characteristic of the invention will be pointed out in the annexed claims, the invention itself as to its objects and advantages and the manner in which it may be carried out may be better understood by reference to the following description taken in connection with the accompanying drawing forming a part hereof, in which:

Fig. 1 is a schematic sketch showing a top view of an aggregate forming layout, indicating but one of the various forms of apparatus by which the method of the present invention may be carried out; and Fig. 2 is a side view of the layout shown in Fig. 1.

The following is a step-by-step process for manufacturing lightweight aggregate according to the method of the present invention when utilizing apparatus such as has been illustrated for convenience.

First, raw material, such as clay, is introduced into a pug-mill 1 which kneads or pugs the clay. The pug-mill 1 is partitioned off into two sections, one being considerably larger than the other, so that the raw clay or similar material may be placed into the larger portion and carbonaceous, combustible or gas-producing material may be added in the smaller portion, said material being supplied by means of a screw feeder tube 2 from a storage bin 3 containing various admixtures, such as fly-ash, pulverized coal, or the like. After the clay has been pugged it is then transmitted by means of conveyor belt 4 to a disintegrator and smooth roll crusher 5 which disintegrates the lumps of clay, ejecting the larger stones, and crushes the clay into a mass which can be passed through small apertures of a die.

The crushed material is then deposited by the disintegrator 5 into a second pug-mill 6 which further kneads and mixes the clay together with the admixtures. At this point some water, if necessary, may be added in order to render the clay sufficiently workable for subsequent extrusion. Following the second mixing the pugged material is then introduced into a de-airing auger machine 7 which is similar to a standard brick making machine except that the die through which the material is extruded has a plurality of small holes. Upon extrusion the clay is forced through said die to form a plurality of small cylinders of clay which may vary generally between about ⅛ to 1 inch in diameter or larger, depending upon the size of the die apertures, and which are repeatedly cut off in desired lengths by a knife sweeping across the face of the die.

Fig. 1 in the drawing shows two auger machines set up at this stage of the operation while proceeding from that point thereon there are illustrated two identical trains side by side for carrying out the method of the present invention. Although the present process can be practiced with a single train, since it is desirable to produce pellets of aggregate of more than one size simultaneously for production in volume, it is suggested that multiple trains be set up with different die sizes in each of the de-airing auger machines. If one train is used, however, successive batches of different sized pellets may be formed by simply changing the die on the auger machine. It is to be noted at this point that for best results it is necessary to have uniform diameter apertures in each die to provide uniform pellets for each batch since expansion of the lightweight aggregate can best be achieved by the uniformity of the pellets to be heated.

As the pellets are cut off from the discharge end of the auger machine they drop onto an inclined plate 8, which preferably vibrates. At this point a dusting material is simultaneously dropped from a storage bin 9. The dusting material, which may consist of fly ash, fine sand, or dry pulverized shale, slate or clay, is added to the pellets to keep them from sticking together. If, however, the pellets are comparatively dry, the dusting step may not be required. This will depend upon the nature of the clay and its moisture content.

The pellets are next transmitted from the inclined plate 8 to a steel conveyor belt dryer. It is essential that the pellets be evenly distributed upon conveyor belt dryer 10 so that the drying process will remove moisture uniformly from each of the pellets. If the type of clay that is used is particularly moist, an additional, optional vibrating plate 12 may be provided for distributing the pellets more evenly upon a second optional conveyor belt dryer 13, heated air to which is supplied by heater 11. A proper drying is essential because otherwise when the pellets are fired rapidly, the presence of too much moisture would cause them to burst into small pieces. The characteristics of the clay used will determine whether one or two conveyor belt dryers are to be used.

After being thoroughly dried the pellets are then transferred by means of bucket elevator 14 to a vibratory feeder 15 which drops the pellets at 16 upon the surface of the kiln hearth. In advance of the pellets being dropped on the surface of the kiln hearth, there is deposited upon said surface a layer of powdered material so that when the pellets fall onto the hearth they will be prevented from rolling around and pressing against each other. The fly ash, which is stored in bin 18 is transferred by means of conveyor 17 through aperture 16 or 16a on the hearth. If it is desired to deliver the fly ash cushioning material to the hearth simultaneously with the delivery of the pellets, a common aperture may be provided at point 16 in the roof of the kiln 14a, as shown in the kiln of the lower train of Fig. 1. It is preferable, however, to deliver the cushioning fly ash to the hearth surface somewhat in advance of the pellets, and, therefore, I provide a separate aperture at point 16a for such purpose as shown in the upper kiln of Fig. 1. The pellets drop upon the layer of cushioning dust and evenly distribute themselves over the surface of the kiln hearth. The discharge chute 19a transfers the finished pellets and dust to conveyor belt 19 from which they may be segregated and packaged or piled.

If shale or slate are used instead of clay the shale or slate is ground fine to pass it through a screen, preferably 20 mesh to dust. The ground material may then be placed initially into the pug-mill 6 with sufficient water added to make it extrudable after mixing. If the shale or slate does not have sufficient carbon content, a proper amount of carbonaceous material such as fly-ash or coal dust may be added. From that point on the same procedure takes place as described heretofore in respect of clay.

Since the pellets are substantially dry before being introduced into the kiln, the temperature in the kiln may be arranged to bring the pellets up to high heat without any danger of bursting the pellets. The heat in the bloating zone of the kiln is maintained at between 1800° F. to 3000° F. depending upon the size of the pellets, the nature and quality of the clay, shale or slate, and the nature and amount of the admixes, if any.

The intense heat in the bloating zone of the kiln brings the pellets quickly to a red heat thus making the skin surface hard. Bringing the shapes to a red heat, in effect, case hardens the pellets so that a seal is formed on the surface, thus preventing the escape of gases from the inside of the pellets. As the heat then penetrates the pellets, the particles of the combustible or gas forming material produce fine gas bubbles, voids or pores which expand when the pellets become somewhat more viscous at the temperature of viscous or scoriaceous vitrification, the particles upon combustion and/or volatilization have produced multitudinous pores which are substantially evenly distributed throughout the mass of each pellet.

Comminuted carbonaceous material such as pulverized coal, coke, fly ash or peat may be used as an admix to produce expansion. It may also be feasible to use various carbonaceous or hydrocarbon oils or comminuted naphthalene as an expansion producing admix. If the clay has not enough initially present carbonaceous material, the proportion of admix that is added may vary from 0.1% to 50% by weight depending upon the bloating characteristics of the particular clay.

Instead of using naphthalene as an expansion producing material it is possible also to use other organic substances which like naphthalene will volatilize at a sufficiently high temperature so as not to be driven off from the pellets during the initial heating stages. Diphenyl may thus be used in place of naphthalene as well as various chlorinated aromatic hydrocrabons such as chlorbenzene, chlornaphthalene, chlordiphenyl. In general, those organic materials which will vaporize without dissociation will be found to be particularly useful.

The apparatus which has been illustrated as one means whereby the process of my invention may be carried out utilizes a rotary hearth type kiln wherein the last firing operation is performed. Other types of kilns may be used. Thus it is possible to employ a kiln wherein the pellets of clay supported on the layer of fly ash are carried through a heating zone as for example on an endless belt of suitable refractory or heat-resistant material. Similarly, by the use of a sufficient amount of fly ash as the blanket the firing operation may be performed in a rotary kiln in which case the fly ash will serve as the means whereby the pellets are prevented from agglomerating while they are in the wet or plastic state. The fly ash burning off during the firing operation will assist in keeping the clay particles from agglomerating and when burned off during the latter stages of the firing operation will leave the clay aggregate particles substantially uncoated with the fly ash residue which as in the other processes is used to advantage as the "fines" constituent of the ultimate aggregate mix such as used for the production of concrete blocks.

Thus, the process of my invention is not restricted to the utilization of any particular type of apparatus so long as are observed the temperature conditions above specified and so long as fly ash is used as the support for the green pellets and the fly ash then burned off during the firing of the pellets.

Throughout the foregoing description and in the appended claims where reference is made to fly ash, I intend to denote this well-known product as defined for example in the article by Steiner in the 1946 volume of "Fuels and Fuel Burners," pages 169 and 170. An illustrative composition of fly ash which is shown to have a carbon content of about 10% is given in Table I, page 552, volume 66, August 1944, "Transactions of the American Society of Mechanical Engineers."

While in carrying out my invention I prefer to use fly ash as the bloating constituent of the clay pellets and also the bed on which the clay pellets are burned, because of the ready availability at low cost of fly ash, it is nevertheless within the contemplation of my invention to use a synthetically prepared material which has about the proportions of inert and carbonaceous material as does fly ash. Thus, in the broad aspects of my invention it contemplates the fusion of the clay pellets which may or may not be accompanied by bloating as desired on a bed which is an admixture of inert and combustible components. The distribution of a minor amount of combustible material in the bed on the otherwise inert bed on which the pellets are supported during firing leads to a number of advantages in that the pellets are kept separate and of greater importance is the fact that the combustion of the carbon content of the layer generates enough heat in such layer so that the layer does not act as an insulating blanket which would otherwise be the case were the layer devoid of heat-generating combustible components. In the event of a synthetically prepared layer, satisfactory results will be secured if the otherwise substantially inert layer contains from about 1% to 25% of a combustible component such as carbon.

Other modes of applying the principle of the invention may be employed, change being made as regards the details described, provided the features stated in any of the following claims or the equivalent of such be employed.

I, therefore, particularly point out and distinctly claim as my invention:

1. A method of making lightweight aggregates which comprises placing a layer of pulverized fly ash upon the surface of the hearth of a kiln, forming pellets from an admixture of unburned clay and fly ash, drying the pellets, dropping the dried pellets upon the layer of fly ash on the hearth surface, heating said kiln to a sufficiently high temperature rapidly to fire said pellets and substantially to burn off the carbon content of said fly ash, and removing said fired pellets from the kiln as a lightweight aggregate in the form of discrete particles substantially free of agglomerates.

2. A method of making a lightweight aggregate which comprises placing a layer of pulverized fly ash upon the surface of the hearth of a kiln, forming pellets from an admixture of unburned clay and carbonaceous material, drying the pellets, dropping the dried pellets upon the layer of fly ash on the hearth surface, and maintaining temperature zones within said kiln whereby the carbon content of said layer is burned off and said pellets become bloated.

3. A method of making lightweight aggregate which comprises mixing clay with fly ash in an amount up to 50% by weight, extruding said material through a die having apertures of desired diameter, cutting the extrusions into pellets of desired lengths, drying the pellets, placing a layer of fly ash on the hearth of a kiln, placing said dried pellets on said layer of fly ash and maintaining temperature zones within said kiln whereby said pellets are rapidly fired and become bloated.

References Cited in the file of this patent

UNITED STATES PATENTS

| | | |
|---|---|---|
| 1,538,482 | Glass | May 19, 1925 |
| 1,786,714 | Greenwalt | Dec. 30, 1930 |
| 1,850,221 | Wyatt et al. | Mar. 22, 1932 |
| 1,877,147 | Slidell et al. | Sept. 13, 1932 |
| 1,939,638 | Hyde | Dec. 12, 1933 |
| 1,941,804 | Kern | Jan. 2, 1934 |
| 2,015,381 | Harding | Sept. 24, 1935 |
| 2,035,845 | Stanton | Mar. 31, 1936 |
| 2,199,046 | Evenstad | Apr. 30, 1940 |
| 2,414,734 | Gelbman | Jan. 21, 1947 |
| 2,654,136 | Harford et al. | Oct. 6, 1953 |
| 2,654,137 | Buron | Oct. 6, 1953 |